(12) United States Patent
Goyal et al.

(10) Patent No.: US 12,346,380 B2
(45) Date of Patent: Jul. 1, 2025

(54) METHOD AND SYSTEM FOR PROVIDING CONTEXT BASED QUERY SUGGESTIONS

(71) Applicant: YAHOO ASSETS LLC, New York, NY (US)

(72) Inventors: Amit Goyal, San Francisco, CA (US); Hongbo Deng, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 18/167,524

(22) Filed: Feb. 10, 2023

(65) Prior Publication Data
US 2023/0185857 A1 Jun. 15, 2023

Related U.S. Application Data

(63) Continuation of application No. 16/451,062, filed on Jun. 25, 2019, now Pat. No. 11,580,168, which is a continuation of application No. 14/962,081, filed on Dec. 8, 2015, now Pat. No. 10,380,192.

(51) Int. Cl.
| | |
|---|---|
| *G06F 16/00* | (2019.01) |
| *G06F 16/31* | (2019.01) |
| *G06F 16/332* | (2019.01) |
| *G06F 16/334* | (2025.01) |
| *G06F 16/35* | (2019.01) |
| *G06F 16/9035* | (2019.01) |

(52) U.S. Cl.
CPC ......... *G06F 16/9035* (2019.01); *G06F 16/31* (2019.01); *G06F 16/3322* (2019.01); *G06F 16/334* (2019.01); *G06F 16/35* (2019.01)

(58) Field of Classification Search
None
See application file for complete search history.

(56) References Cited

U.S. PATENT DOCUMENTS

| | | | |
|---|---|---|---|
| 2006/0122979 A1* | 6/2006 | Kapur | G06F 16/3326 |
| 2006/0248078 A1 | 11/2006 | Gross et al. | |
| 2008/0077588 A1* | 3/2008 | Zhang | G06Q 30/00 |
| 2009/0106224 A1 | 4/2009 | Roulland et al. | |
| 2009/0157599 A1* | 6/2009 | Klinkner | G06Q 30/02 |
| | | | 707/E17.135 |
| 2009/0287682 A1 | 11/2009 | Fujioka et al. | |
| 2011/0035469 A1* | 2/2011 | Smith | H04L 61/4511 |
| | | | 709/225 |
| 2012/0036123 A1 | 2/2012 | Hasan et al. | |
| 2012/0136855 A1 | 5/2012 | Ni et al. | |
| 2012/0296927 A1* | 11/2012 | Velipasaoglu | G06F 16/9535 |
| | | | 707/E17.016 |
| 2013/0282709 A1 | 10/2013 | Zhu et al. | |
| 2013/0282754 A1* | 10/2013 | Son | G06F 16/2455 |
| | | | 707/769 |

(Continued)

*Primary Examiner* — Bai D Vu
(74) *Attorney, Agent, or Firm* — Venable LLP

(57) ABSTRACT

The present teaching relates to providing a query suggestion. In one example, a request is received for query suggestions with respect to a query prefix input by a user. A plurality of query suggestions is determined based on the query prefix and a preceding query input by the user. A degree of popularity of the preceding query is determined. One or more query suggestions are selected from the plurality of query suggestions based on the degree of popularity of the preceding query. The one or more query suggestions are provided as a response to the request.

9 Claims, 14 Drawing Sheets

(56) References Cited

U.S. PATENT DOCUMENTS

| | | | |
|---|---|---|---|
| 2015/0161276 A1* | 6/2015 | Upstill | G06F 16/951 |
| | | | 707/708 |
| 2015/0169606 A1* | 6/2015 | Zhu | G06F 16/3325 |
| | | | 707/706 |
| 2016/0239490 A1 | 8/2016 | Dhamdhere et al. | |

* cited by examiner

Specialization Suggestsions: 410

{ brad pitt ⇒ angelina jolie and brad pitt, brad pitt movies, brad pitt net worth
- - - - - }

Lateral Suggestions: 420

{ aston kutcher ⇒ demi moore, mila kunis
brad pitt ⇒ angelina jolie, al pacino, adam sandler, ben affleck, bradley copper, bruce willis
- - - - - }

FIG. 4

METHOD AND SYSTEM FOR PROVIDING CONTEXT BASED QUERY SUGGESTIONS

CROSS-REFERENCE TO RELATED APPLICATIONS

The present application is a continuation of U.S. patent application Ser. No. 16/451,062, filed on Jun. 25, 2019, which is a continuation of U.S. patent application Ser. No. 14/962,081 filed Dec. 8, 2015, the contents of which are hereby incorporated by reference in their entireties.

BACKGROUND

1. Technical Field

The present teaching relates to methods, systems, and programming for Internet services. Particularly, the present teaching is directed to methods, systems, and programming for providing context based search suggestions.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Known major search engines have features called "search/query suggestion" or "query auto-completion (QAC)" designed to help users narrow in on what they are looking for. For example, as users type a search query, query suggestions are displayed to assist the users in selecting a desired search query. Query suggestion facilitates faster user query input by predicting user's intended full queries given the user's inputted query prefix.

However, existing query suggestion techniques treat all queries uniformly and generate fixed number of suggestions for each query. In addition, known query suggestion systems do not make full use of contextual information for selecting the query suggestions.

Therefore, there is a need to provide an improved solution for providing query suggestions to solve the above-mentioned problems.

SUMMARY

The present teaching relates to methods, systems, and programming for Internet services. Particularly, the present teaching is directed to methods, systems, and programming for providing context based search suggestions.

In one example, a method, implemented on a machine having at least one processor, storage, and a communication platform capable of connecting to a network for providing a query suggestion is disclosed. A request is received for query suggestions with respect to a query prefix input by a user. A plurality of query suggestions is determined based on the query prefix and a preceding query input by the user. A degree of popularity of the preceding query is determined. One or more query suggestions are selected from the plurality of query suggestions based on the degree of popularity of the preceding query. The one or more query suggestions are provided as a response to the request.

In a different example, a system having at least one processor, storage, and a communication platform capable of connecting to a network for providing a query suggestion is disclosed. The system includes a query suggestion request analyzer configured for receiving a request for query suggestions with respect to a query prefix input by a user; a query pair based query suggestion generator configured for determining a plurality of query suggestions based on the query prefix and a preceding query input by the user; a query popularity determiner configured for determining a degree of popularity of the preceding query; and a query suggestion selector configured for selecting one or more query suggestions from the plurality of query suggestions based on the degree of popularity of the preceding query, and providing the one or more query suggestions as a response to the request.

Other concepts relate to software for implementing the present teaching on providing context based search suggestions. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for providing a query suggestion is disclosed. The information, when read by the machine, causes the machine to perform the following: receiving a request for query suggestions with respect to a query prefix input by a user; determining a plurality of query suggestions based on the query prefix and a preceding query input by the user; determining a degree of popularity of the preceding query; selecting one or more query suggestions from the plurality of query suggestions based on the degree of popularity of the preceding query; and providing the one or more query suggestions as a response to the request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 illustrates two categories of exemplary query suggestions, according to an embodiment of the present teaching;

DETAILED DESCRIPTION

Figure 1:
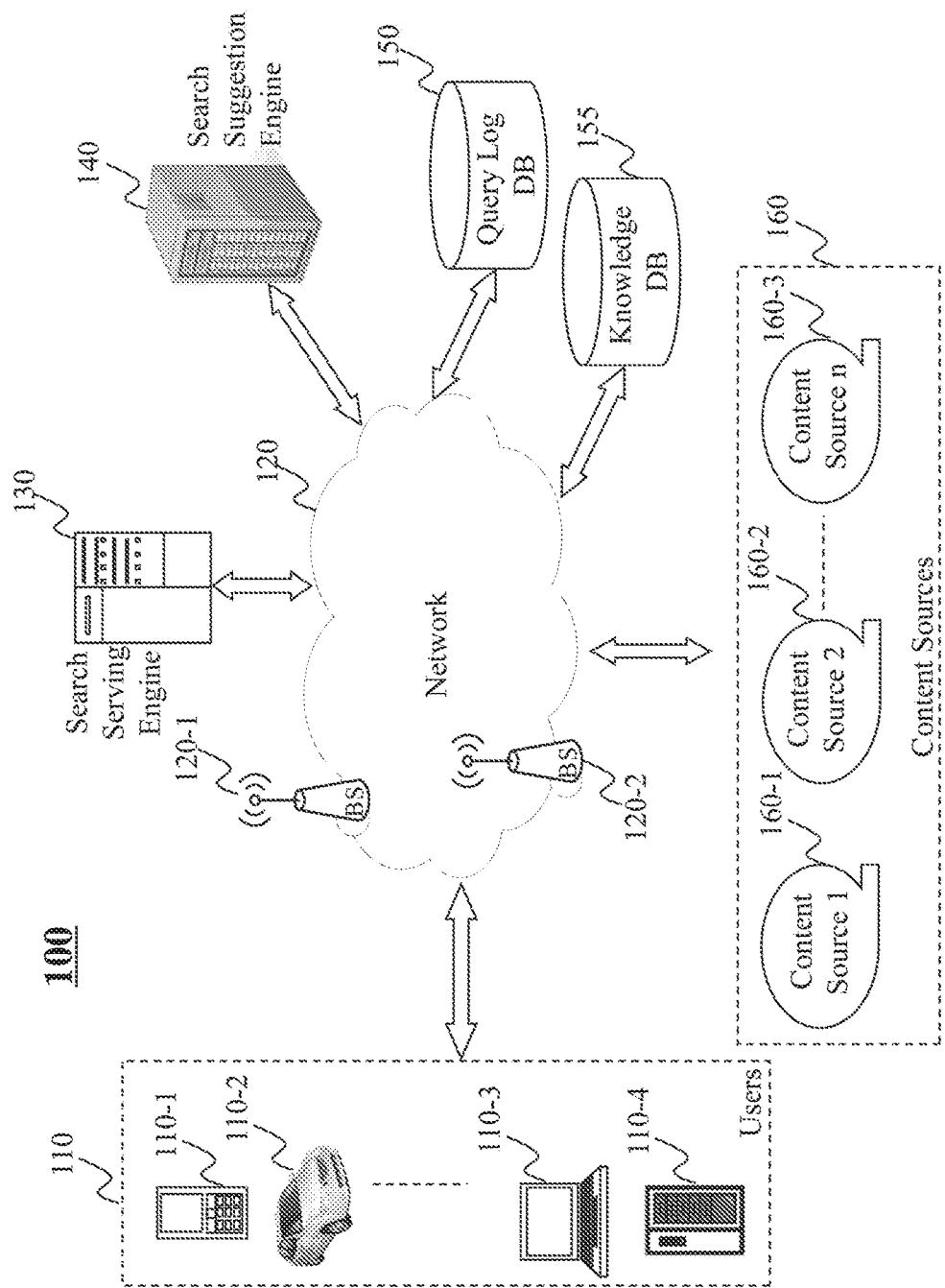
FIG. 1 is a high level depiction of an exemplary networked environment for providing context based query suggestions, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively providing search suggestions. The method and system as disclosed herein aim at improving end-users' search experience by reducing user efforts in formulating queries. For any prefix input by a user, the disclosed system can generate more relevant query suggestions based on the prefix and a preceding query input by the user. The preceding query may be a previous query input by the user within a same search session. In general, the system can exploit users' previous queries as context for generating query suggestions. For example, based on a degree of popularity of the preceding query, the system can select one or more query suggestions from the generated query suggestions. In accordance with a power law distribution of queries, the system may adaptively generate more suggestions for popular queries (e.g. "Walmart", "Brad Pitt", "Kobe Bryant") and fewer suggestions for unpopular queries.

From query logs associated with many users, the system can mine query pairs that are searched together frequently by the users. After cleaning up the query pairs with some criteria, the system can achieve filtered query pairs each of which includes two queries that are correlated to each other, such that after a user searched with one of the two queries, it is likely for the user to be interested in searching with the other one of the two queries, especially when the other query starts with the prefix input by the user in the same search session. Each query pair may be associated with a collocation score representing a degree of correlation between the two queries in the query pair. As such, the system may select and rank the one or more query suggestions based on collocation scores associated with query pairs each of which includes both the preceding query and one of the generated query suggestions.

In addition, from the query logs, the system may also exploit a most prominent clicked Uniform Resource Locator (URL) for each query to cluster similar queries together. For each query cluster, the system may select a canonical query, e.g. a most popular query in the cluster, to represent the cluster. As such, the system can determine a cluster that includes the preceding query, and utilize the canonical query of the cluster as a bridge query to generate more query suggestions.

The proposed system can increase the coverage and relevance of query suggestion pairs for contextual QAC. The proposed approach is simple, easy to implement, fast, and can overall improve search assistance, especially for mobile search experience.

The terms "query suggestion" and "search suggestion" may be used interchangeably herein. The terms "query prefix" and "prefix" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for providing context based query suggestions, according to an embodiment of the present teaching. In FIG. 1, the exemplary networked environment 100 includes one or more users 110, a network 120, a search serving engine 130, a search suggestion engine 140, a query log database 150, a knowledge database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the search serving engine 130 and the search suggestion engine 140 through wired or wireless technologies and related operating systems implemented within user-wearable devices (e.g., glasses, wrist watch, etc.).

A user, e.g., the user 110-1, may send a query or query prefix to the search serving engine 130 via the network 120 and receive query suggestions and search results from the search serving engine 130. The query suggestions can be generated at the search suggestion engine 140, based on the query or query prefix sent by the user 108.

The search serving engine 130 and the search suggestion engine 140 may access information stored in the knowledge database 155 and the query log database 150 via the network 120. The information in the knowledge database 155 and the query log database 150 may be generated by one or more different applications (not shown), which may be running on the search serving engine 130, at the backend of the search serving engine 130, or as a completely standalone system capable of connecting to the network 120, accessing information from different sources, analyzing the information, generating structured information, and storing such generated information in the knowledge database 155 and the query log database 150. The query log database 150 may include query logs of different users of the search serving engine 130.

The search suggestion engine 140 may generate query suggestions based on a prefix and a preceding query input by a user of the search serving engine 130. Based on a degree of popularity of the preceding query, the search suggestion engine 140 can select one or more query suggestions from the generated query suggestions. In accordance with a power law distribution of queries, the search suggestion engine 140 may adaptively generate more suggestions for popular queries (e.g. "Walmart", "Brad Pitt", "Kobe Bryant") and fewer suggestions for unpopular queries. From query logs in the query log database 150, the search suggestion engine 140 can mine query pairs that are searched together frequently by the users, filter the query pairs in accordance with some criteria, and generate the query suggestions based on some relevant query pairs each of which includes the preceding query and another query starting with the prefix input by the user. The search suggestion engine 140 may also rank the query suggestions based on collocation scores associated with the relevant query pairs. In addition, from the query logs in the query log database 150, the search suggestion engine 140 may also cluster similar queries together based on their most clicked URLs. For each cluster, the search suggestion engine 140 may select a canonical query, e.g. a most popular query in the cluster, to represent the cluster. As such, the search suggestion engine 140 can determine a cluster that includes the preceding query, and utilize the canonical query of the cluster as a bridge query to generate more query suggestions.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 130 may access information from any of the content sources 160-1, 160-2 . . . 160-3. For example, the search serving engine 130 may fetch content, e.g., websites, through its web crawler to build a search index.

Figure 2:
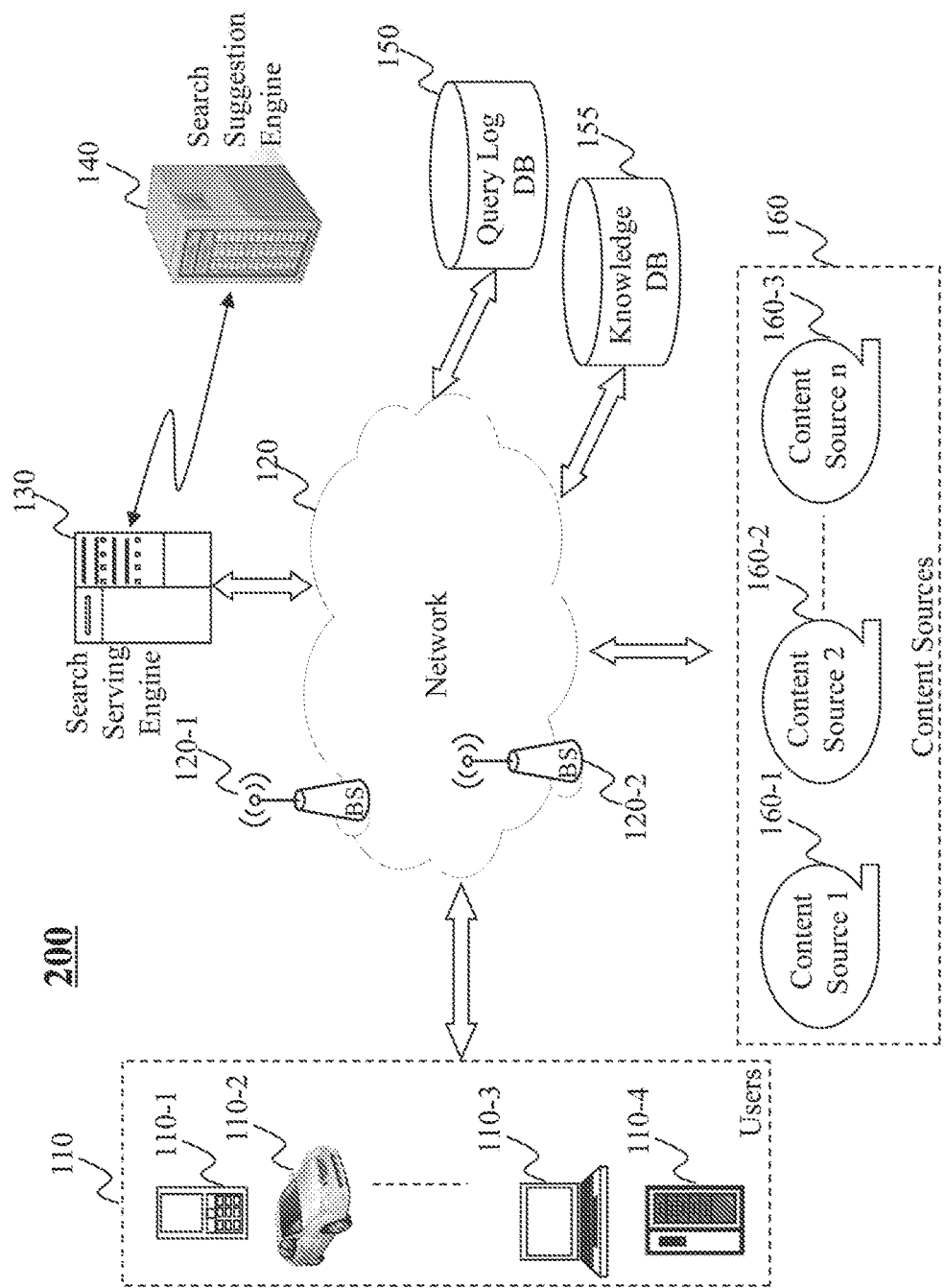
FIG. 2 is a high level depiction of another exemplary networked environment for providing context based query suggestions, according to an embodiment of the present teaching.

FIG. 2 is a high level depiction of another exemplary networked environment 200 for providing context based query suggestions, according to an embodiment of the present teaching. The exemplary networked environment 200 in this embodiment is similar to the exemplary networked environment 100 in FIG. 1, except that the search suggestion engine 140 serves as a backend system for the search serving engine 130.

Figure 3:
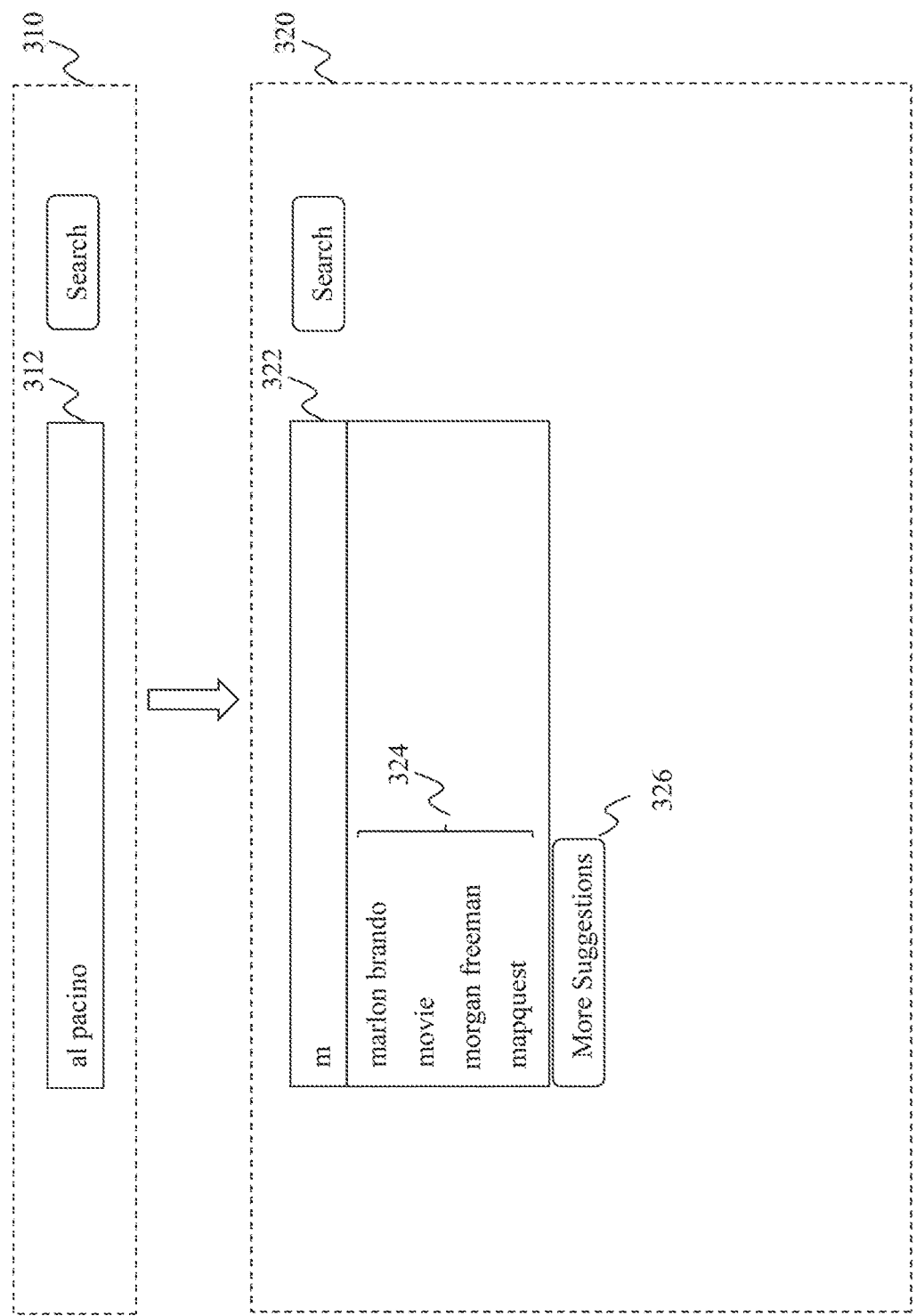
FIG. 3 illustrates user interfaces for providing query suggestions based on a previous query and a prefix in a current search, according to an embodiment of the present teaching.

FIG. 3 illustrates user interfaces for providing query suggestions based on a previous query and a prefix in a current search, according to an embodiment of the present teaching. As shown in FIG. 3, after a user inputs a query "al pacino" 312 during a previous search 310, the user inputs a prefix "m" 322 during the current search 320. At this point, the system provides query suggestions 324 starting with the prefix "m" to the user. The query suggestions may be generated based on the previous query "al pacino" 312. For example, "marlon brando" is suggested because both "al pacino" and "marlon brando" are popular actors who worked together in an iconic movie "godfather." For example, "movie" is suggested because "al pacino" is a famous actor stared in many movies. For example, "morgan freeman" is suggested because "morgan freeman" is a famous actor just like "al pacino." In addition, more query suggestions may be generated without considering the previous query "al pacino" 312. As shown in FIG. 3, the system may rank the query suggestions based on their degrees of correlation with the previous "al pacino" 312. In this example, context based query suggestion "marlon brando" is ranked higher than the non-contextual query suggestion "mapquest". The user may click on the button "More Suggestions" 326 to view more suggestions.

The previous search 310 and the current search 320 may be in a same search session. A "search session" can be defined as all queries made by a user in a particular time period, e.g. 10 minutes, 30 minutes, or a day. Alternatively, a "search session" may start from receiving a sequence of requests from a single end-user during a visit to a particular website, and end after inactivity of the user for a certain time period, e.g. 10 minutes or 30 minutes.

The previous query "al pacino" 312 may be a preceding query that was input by the user immediately before the prefix "m" 322, within a same search session. In other embodiments, the system may generate query suggestions based on multiple previous queries in the same search session.

FIG. 4 illustrates two categories of exemplary query suggestions, according to an embodiment of the present teaching. As shown in FIG. 4, a specialization suggestion 410 may refer to either a query suggestion that is a substring of a preceding query or a query suggestion that includes the preceding query as a substring. For example, if the preceding query is "brad pitt", the query suggestions "angelina jolie and brad pitt" and "brad pitt movies" are specialization query suggestions. Any suggestions, that are generated based on the preceding query and are not specialization suggestions, can be referred to as lateral suggestions 420. For example, if the preceding query is "brad pitt", the query suggestions "angelina jolie" and "al pacino" are lateral query suggestions. In one embodiment, given a preceding query, the system may prefer to provide lateral suggestions over specialization suggestions.

Figure 5:
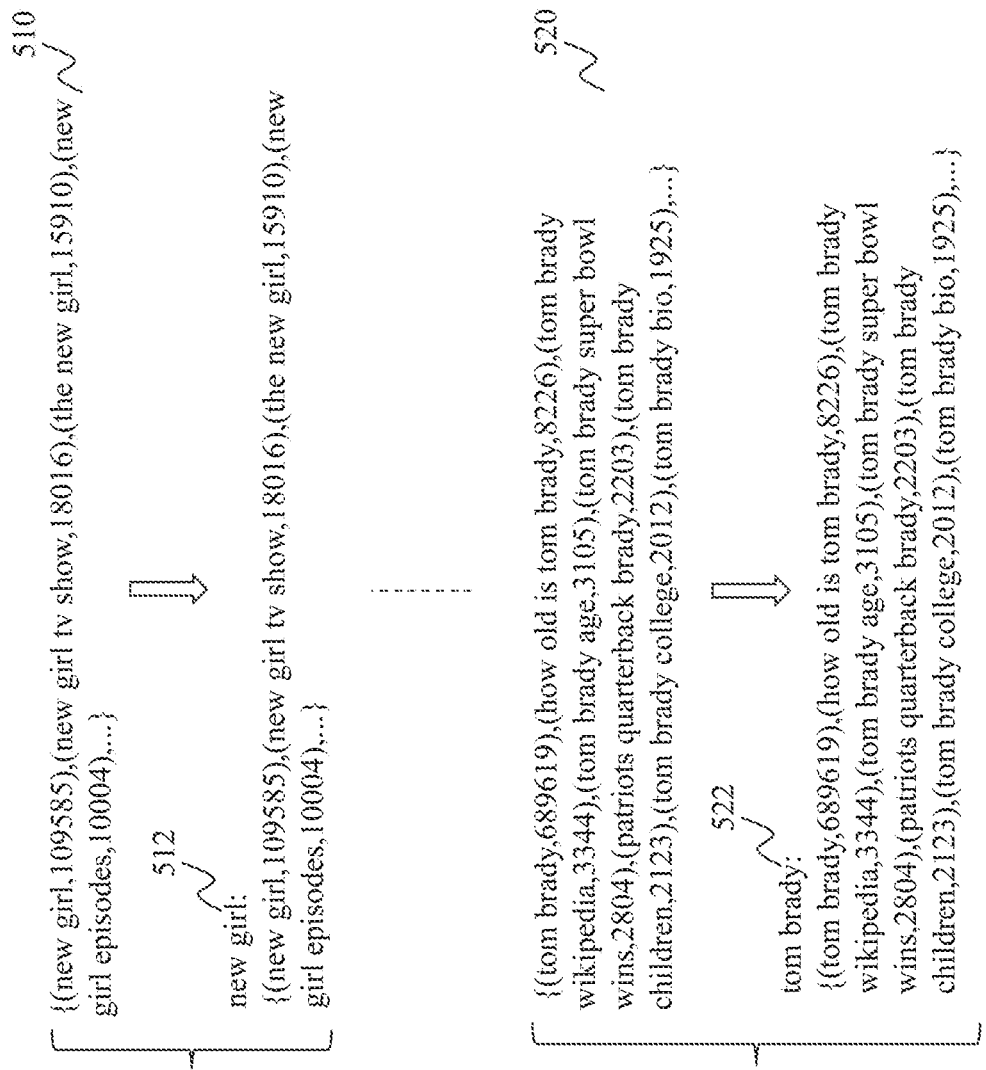
FIG. 5 illustrates exemplary query clusters, according to an embodiment of the present teaching.

FIG. 5 illustrates exemplary query clusters, according to an embodiment of the present teaching. As discussed above, the system may mine query logs in the query log database 150 to cluster similar queries together based on their most clicked URLs. For each query in the query logs, many users may have searched with the query and then clicked on some URLs provided by the search serving engine 130 based on the query. Among the URLs clicked with respect to the query, the URL clicked for the most times or by most users can be defined as the most clicked URL for the query. The system may assign queries into a same query cluster if the queries have the same most clicked URL.

As shown in FIG. 5, the query cluster 510 includes queries "new girl", "new girl tv show", "the new girl", etc., all of which have a same most clicked URL, e.g. a URL directed to an official website of the TV show New Girl. The query cluster 520 shown in FIG. 5 includes queries "tom brady", "how old is tom brady", "tom brady wikipedia", etc., all of which have a same most clicked URL, e.g. a URL directed to a Wikipedia web page about Tom Brady. It can be understood that more query clusters can be generated by the system in a similar way.

For each query cluster, the system may select a canonical query to represent the query cluster. The canonical query may be a query that is most popular in the query cluster. As shown in FIG. 5, each query in a query cluster is associated with a query frequency that represents how many times the query has been searched with. Then, the system may select a query with the highest query frequency among the queries in a query cluster to be the canonical query representing the query cluster. For example, the system selects the query "new girl" 512 as the canonical query representing the query cluster 510, because the query "new girl" 512 has the highest query frequency in the query cluster 510; the system selects the query "tom brady" 522 as the canonical query representing the query cluster 520, because the query "tom brady" 522 has the highest query frequency in the query cluster 520.

Figure 6:
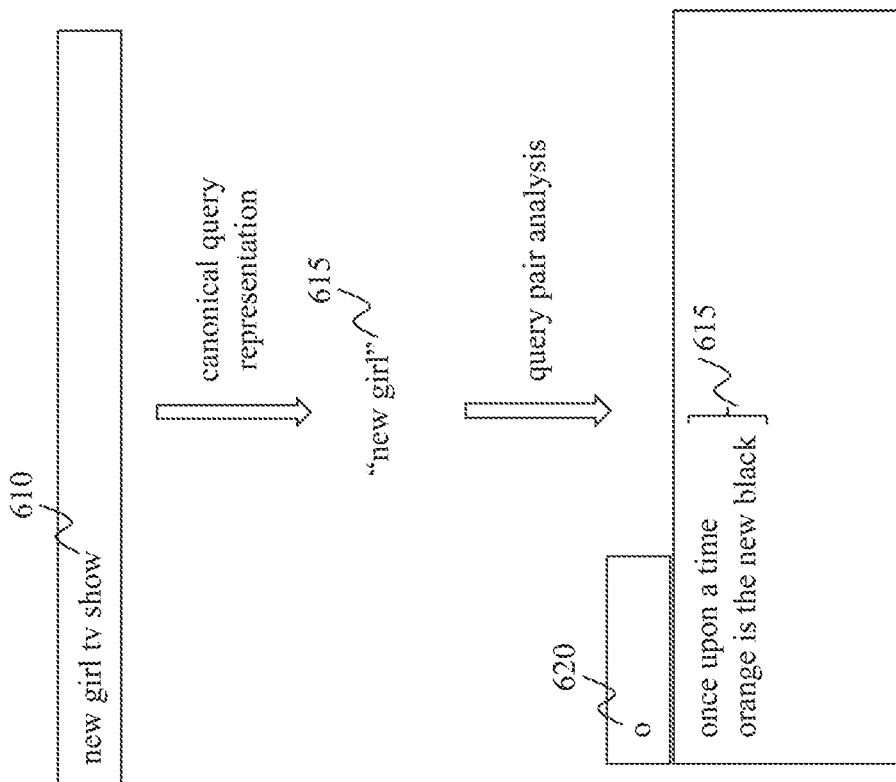
FIG. 6 illustrates a process for generating query suggestions based on a bridge query, according to an embodiment of the present teaching.

FIG. 6 illustrates a process for generating query suggestions based on a bridge query, according to an embodiment of the present teaching. As shown in FIG. 6, after a user inputs a query "new girl tv show" 610 during a previous search, the user inputs a prefix "o" 620 in a current search. At this point, the system is trying to provide query suggestions to the user based on the previous query "new girl tv show" 610 and the prefix "o" 620. In one case, the query "new girl tv show" 610 does not have a good correlated query suggestion in the query logs, e.g. when the query "new girl tv show" 610 is not paired with another query starting with "o" in a same session within the query logs. In this case, the system may first determine a query cluster that includes the query "new girl tv show" 610, and then identify the canonical query of the query cluster. As such, the system can identify the canonical query "new girl" 615 that represents the query cluster including the previous query "new girl tv show" 610. Since the canonical query "new girl" 615 has a higher query frequency than that of the query "new girl tv show" 610, it is likely that the canonical query "new girl" 615 is paired with some query starting with "o" in the query logs. Therefore, the system can determine query suggestions based on the canonical query "new girl" 615. The query "new girl" 615 may be referred as a bridge query because the system utilizes the query "new girl" 615 as a bridge to achieve query suggestions "once upon a time" and "orange is the new york" 622.

In one embodiment, after the system determines queries paired with each query in a cluster, the system can assign all of the queries paired with some query in the cluster to be paired with the canonical query of the cluster. In this case, e.g., queries paired with the canonical query "new girl" 615 will include all queries paired with the query "new girl tv show" 610. As such, when the system utilizes the query pairs to provide query suggestions, the system can have a large pool of query suggestions to select, after the system finds the canonical query "new girl" 615 as a bridge query.

Figure 7:
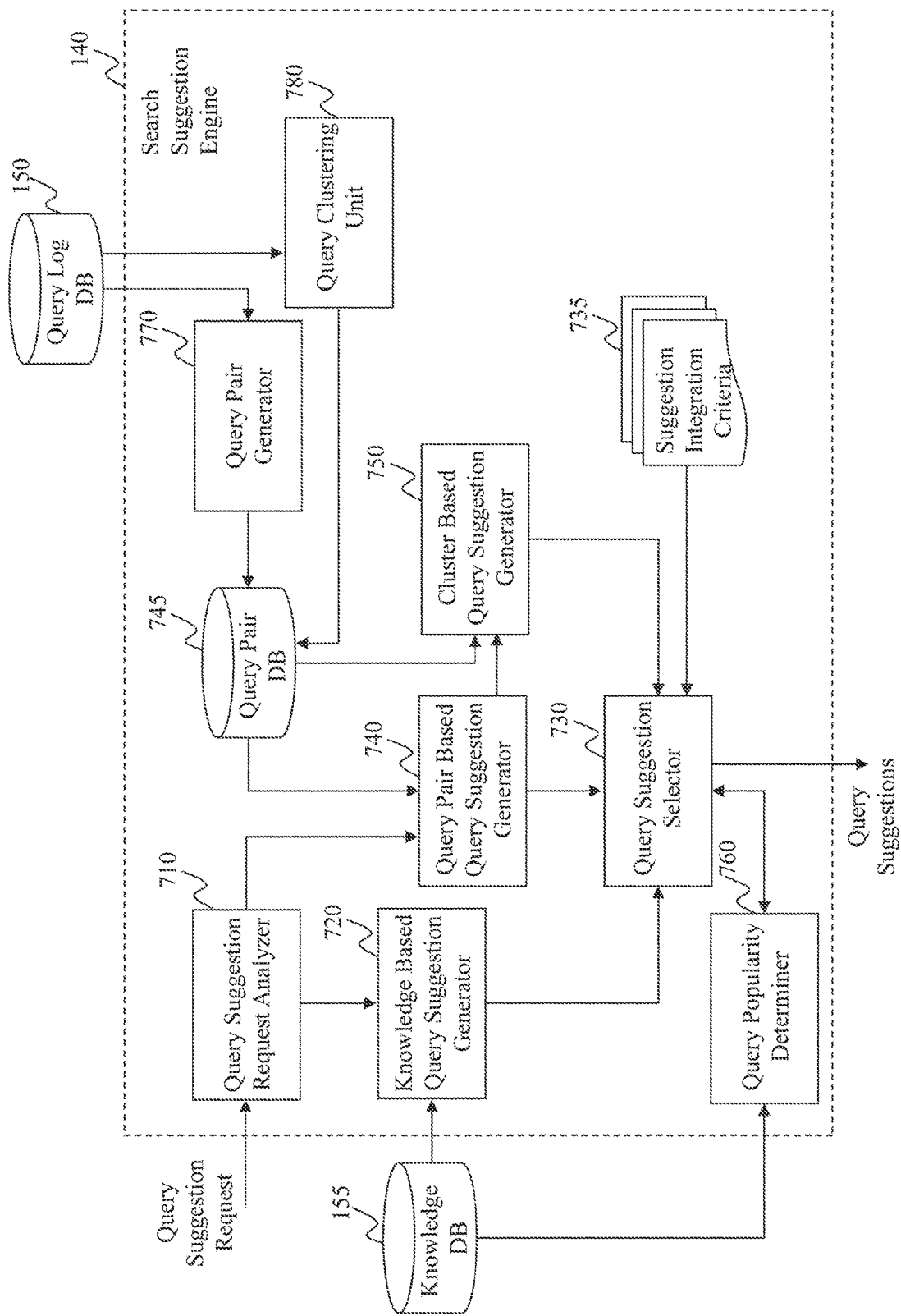
FIG. 7 illustrates an exemplary diagram of a search suggestion engine, according to an embodiment of the present teaching.

FIG. 7 illustrates an exemplary diagram of a search suggestion engine 140, according to an embodiment of the present teaching. The search suggestion engine 140 in this example includes a query suggestion request analyzer 710, a knowledge based query suggestion generator 720, a query suggestion selector 730, a query pair based query suggestion generator 740, a query pair database 745, a cluster based query suggestion generator 750, one or more suggestion integration criteria 735, a query popularity determiner 760, a query pair generator 770, and a query clustering unit 780.

The query suggestion request analyzer 710 in this example receives a request for query suggestions to be provided to a user, either from the search serving engine 130 or directly from the user's device. The query suggestion request analyzer 710 may analyze the request to determine a preceding query and a prefix input by the user. The preceding query may be a previous query input by the user within a same search session, or a query input immediately before the prefix by the user within the same search session. The query suggestion request analyzer 710 may send the request along with the preceding query and the prefix to the knowledge based query suggestion generator 720 and the query pair based query suggestion generator 740.

The knowledge based query suggestion generator 720 in this example receives the preceding query and the prefix from the query suggestion request analyzer 710, and generates one or more knowledge based query suggestions based on the preceding query and the prefix. The one or more knowledge based query suggestions are generated based on some knowledge retrieved from the knowledge database 155. For example, based on a preceding query "big animal" and a prefix "e", the knowledge based query suggestion generator 720 may generate a query suggestion "elephant" based on some common knowledge stored in the 155. The knowledge based query suggestion generator 720 may send the one or more knowledge based query suggestions to the query suggestion selector 730 for selection.

The query pair based query suggestion generator 740 in this example receives the preceding query and the prefix from the query suggestion request analyzer 710, and generates one or more query pair based query suggestions based on the preceding query and the prefix. The one or more query pair based query suggestions are generated based on query pairs retrieved from the query pair database 745. The query pair database 745 in this example stores query pairs generated from query logs associated with many users. For example, based on the query logs associated with many users, two queries "kobe bryant" and "lebron james" are often paired, i.e. input by a same user in two consecutive searches. Then, for a preceding query "kobe bryant" and a prefix "l", the query pair based query suggestion generator 740 may generate a query suggestion "lebron james" based on the query pair retrieved from the query pair database 745. The query pair may be utilized in both directions for generating query suggestions. For a preceding query "lebron james" and a prefix "k", the query pair based query suggestion generator 740 may generate a query suggestion "kobe bryant" based on the same query pair retrieved from the query pair database 745. The query pair based query suggestion generator 740 may send the one or more query pair based query suggestions to the query suggestion selector 730 for selection. In one embodiment, the query pair based query suggestion generator 740 may generate query suggestion based on query pairs retrieved from the user's own query logs.

In one embodiment, the query pair based query suggestion generator 740 may also send the preceding query and the prefix to the cluster based query suggestion generator 750 for generating cluster based query suggestions. As discussed above, each query may be assigned to a query cluster based on a most clicked URL associated with the query; and each query cluster has a canonical query, e.g. a most popular query in the cluster, to represent the query cluster. The cluster based query suggestion generator 750 in this example can determine a query cluster including the preceding query, and identify the canonical query representing that query cluster. In this manner, the cluster based query suggestion generator 750 can map the preceding query to the associated canonical query. For example, as shown in FIG. 5, the cluster based query suggestion generator 750 may map a preceding query "how old is tom brady" to the associated canonical query "tom brady". Then, the cluster based query suggestion generator 750 can utilize the associated canonical query "tom brady" as a bridge query to generate query suggestions that are paired with the associated canonical query "tom brady", based on query pairs retrieved from the query pair database 745, and send the query suggestions to the query suggestion selector 730 for selection.

The query suggestion selector 730 in this example receives query suggestions from the knowledge based query suggestion generator 720, the query pair based query suggestion generator 740 and/or the cluster based query suggestion generator 750. The query suggestion selector 730 can select one or more query suggestions from the received query suggestions, based on some suggestion integration criteria 735. For example, according to one suggestion integration criterion, the query suggestion selector 730 may rank lateral suggestions higher than specialization suggestions. According to another suggestion integration criterion, the query suggestion selector 730 may rank query pair based suggestions and cluster based suggestions higher than knowledge based suggestions. According to yet another suggestion integration criterion, the query suggestion selector 730 may rank query pair based suggestions higher than cluster based suggestions. According to still another suggestion integration criterion, the query suggestion selector 730 may rank query pair based suggestions or cluster based suggestions based on collocation scores associated with the query pairs. A collocation score can represent a degree of correlation between the two queries in a corresponding query pair, and therefore represent a degree of correlation between the preceding query and a query suggestion generated based on the corresponding query pair.

In one embodiment, according to one suggestion integration criterion, the query suggestion selector 730 may send a request to the query popularity determiner 760 for a degree of popularity of the preceding query. The query popularity determiner 760 can determine a degree of popularity of the preceding query, e.g. based on some common knowledge retrieved from the 155. In another embodiment, the query popularity determiner 760 can also determine a degree of popularity of the preceding query based on information from the query log database 150.

In accordance with a power law distribution of queries, the query suggestion selector 730 may adaptively select a number of suggestions based on the degree of popularity of the preceding query determined by the query popularity determiner 760. For example, the number may be larger for popular queries (e.g. "Walmart", "Brad Pitt", "Kobe Bryant") and smaller for unpopular queries. After the query suggestion selector 730 ranks the query suggestions based on different suggestion integration criteria 735, instead of selecting a fixed number of query suggestions for any preceding query, the query suggestion selector 730 may select an adaptive number of query suggestions from the top of the ranking based on a degree of popularity of the preceding query. The query suggestion selector 730 can then send the selected query suggestion as a response to the query suggestion request, either to the search serving engine 130 or directly to the user's device.

It can be understood that although the preceding query is considered in the above example, the search suggestion engine 140 can consider more previous queries as context, e.g. all previous queries in a same search session as the prefix, for generating query suggestions.

The query pair generator 770 in this example may generate or update the query pairs in the query pair database 745, based on a timer or upon a request from a manager. For example, after a time period, the query logs in the query log database 150 may be updated with new queries. The query pair generator 770 can then retrieve many query pairs from the query logs based on some retrieval criteria, e.g. query pairs that appear within a 10 minutes window. The query pair generator 770 may then filter the many query pairs, based on different filtering criteria to retain query pairs with good correlation between the two queries. The query pair generator 770 may also split the retained query pairs into lateral and specialization groups. For each group, the query pair generator 770 can calculate a collocation score for each query pair. Then, the query pair generator 770 can store the retained query pairs into the query pair database 745, along with metadata like their lateral/specialization properties and their collocation scores.

The query clustering unit 780 in this example may generate or update cluster related information in the query pair database 745, based on a timer or upon a request from a manager. For example, after a time period, the query logs in the query log database 150 may be updated with new queries. The query clustering unit 780 can then retrieve many queries from the query logs based on some retrieval criteria, e.g. within a retrieval period like last year or last three years. The query clustering unit 780 may then assign the queries into different clusters based on their similarity. A similarity between two queries may be measured by a most clicked URL associated with each query. For example, if two queries are both associated with a same most clicked URL, e.g., among the search results provided in response to either of the two queries, the same URL is clicked most frequently, the query clustering unit 780 may then assign the two queries into a same query cluster. For each cluster, the query clustering unit 780 may assign a query in the cluster, e.g. a most popular query in the cluster, as a canonical query to represent the cluster. The canonical queries can be utilized as an inverted index for the query clusters. The query clustering unit 780 may store the cluster related information into the query pair database 745, such that each query in each query pair in the query pair database 745 can be associated with a query cluster and a corresponding canonical query. As discussed above, the canonical query may be utilized as a bridge query to help generating more query suggestions.

Figure 8:
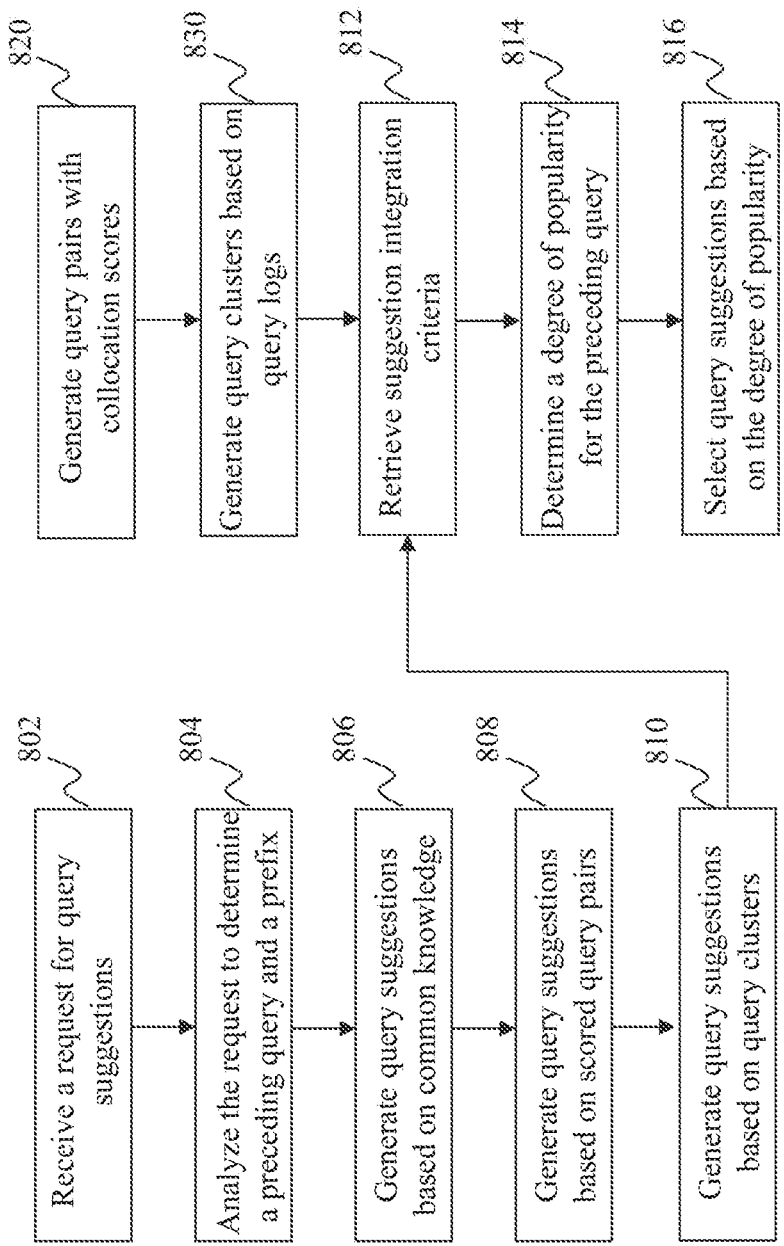
FIG. 8 is a flowchart of an exemplary process performed by a search suggestion engine, according to an embodiment of the present teaching.

FIG. 8 is a flowchart of an exemplary process performed by a search suggestion engine, e.g. the search suggestion engine 140 in FIG. 7, according to an embodiment of the present teaching. A request for query suggestions is received at 802. The request is analyzed at 804 to determine a preceding query and a prefix. At 806, query suggestions are generated based on common knowledge. At 808, query suggestions are generated based on scored query pairs. At 810, query suggestions are generated based on query clusters and canonical queries representing the clusters. The process then moves on to 812.

Query pairs may be generated with collocation scores at 820, from query logs associated with many users. Query clusters may be generated based on the query logs at 830. In one embodiment, the steps 820 and 830 may be performed routinely, independent of the request received at 802. The process can then move on to 812.

One or more suggestion integration criteria are retrieved at 812. A degree of popularity is determined at 814 for the preceding query. Query suggestions are selected at 816 based on the degree of popularity.

It can be understood that the order of the steps shown in FIG. 8 may be changed according to different embodiments of the present teaching.

Figure 9:
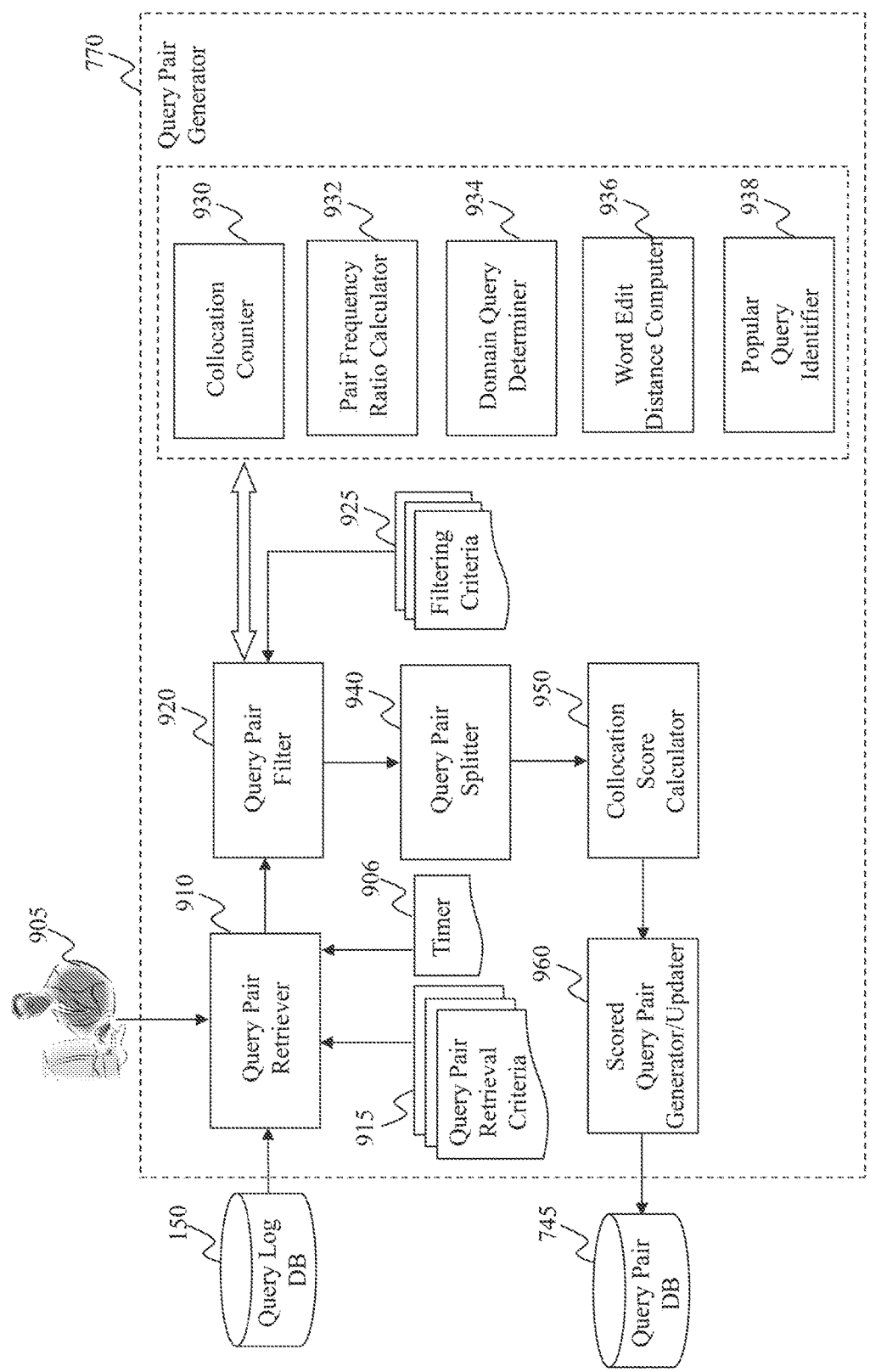
FIG. 9 illustrates an exemplary diagram of a query pair generator, according to an embodiment of the present teaching.

FIG. 9 illustrates an exemplary diagram of a query pair generator 770, according to an embodiment of the present teaching. As shown in FIG. 9, the query pair generator 770 in this example includes a query pair retriever 910, one or more query pair retrieval criteria 915, a timer 906, a query pair filter 920, one or more filtering criteria 925, a collocation counter 930, a pair frequency ratio calculator 932, a domain query determiner 934, a word edit distance computer 936, a popular query identifier 938, a query pair splitter 940, a collocation score calculator 950, and a scored query pair generator/updater 960.

In one embodiment, the query pair retriever 910 may receive a request from a manager 905 to generate or update query pairs in the query pair database 745. In another embodiment, the query pair retriever 910 may be triggered by the timer 906 to generate or update query pairs in the query pair database 745, i.e. the query pair retriever 910 may update the query pairs periodically, e.g. every day, every week, or every month. Either based on the timer 906 or upon the request from the manager 905, the query pair retriever 910 can retrieve some native query pairs from the query log database 150, based on some query pair retrieval criteria 915. For example, according to a query pair retrieval criterion, a native query pair being retrieved must have been searched by a same user within a 10 minutes window. The query pair retriever 910 may then send the native query pairs to the query pair filter 920 for filtering.

The query pair filter 920 in this example can select one or more query pair filtering criteria 925 and filter the native query pairs based on the selected filtering criteria. According to different filtering criteria, the query pair filter 920 may trigger different modules 930~938 for help with the filtering.

In one example, according to a filtering criterion, the query pair filter 920 should remove query pairs with a collocation count less than a threshold, e.g. less than five, which means query pairs that have appeared in the query logs for less than five times during the retrieval period. The query pair filter 920 may then trigger the collocation counter 930 to count the number of times each native query pair appeared in the query logs during the retrieval period. After the collocation counter 930 finishes the counting and sends back the collocation count numbers to the query pair filter 920, the query pair filter 920 can remove all native query pairs with a collocation count less than the threshold. A small collocation count of a query pair may indicate a loose correlation between the two queries in the query pair.

In another example, according to a filtering criterion, the query pair filter 920 should remove a native query pair if a pair frequency ratio between the two queries in the query pair is greater than a threshold. A pair frequency ratio between two queries may refer to a ratio calculated by dividing a frequency of a more popular query in the two queries by a frequency of a less popular query in the two queries. For example, in a query pair <query1, query2>, if query1 has appeared in the query logs for 1 million times during the retrieval period, and query2 has appeared in the query logs for 100 times during the retrieval period, then the pair frequency ratio between the two queries is 10,000. Then, if the threshold is 1000, the query pair filter 920 should remove this query pair <query1, query2>, even if their collocation count is large. The query pair filter 920 may trigger the pair frequency ratio calculator 932 to calculate the pair frequency ratio for each native query pair. After the pair frequency ratio calculator 932 finishes the calculation and sends back the result to the query pair filter 920, the query pair filter 920 can remove all native query pairs with a pair frequency ratio greater than the threshold. A large pair frequency ratio of a query pair may indicate a loose correlation between the two queries in the query pair.

In yet another example, according to a filtering criterion, the query pair filter 920 should remove a native query pair if one of the two queries in the query pair is a domain name, like xxx.com, yyy.net, etc. The query pair filter 920 may trigger the domain query determiner 934 to determine whether each native query pair includes a domain name query or not. After the domain query determiner 934 sends back the result to the query pair filter 920, the query pair filter 920 can remove all native query pairs including at least one query that is a domain name. A domain name may not be a good query suggestion for a user, because a domain name in a search box may indicate the user's interest to a specific website, which can be independent of the preceding query or subsequent query.

In still another example, according to a filtering criterion, the query pair filter 920 should remove a native query pair if a word edit distance between the two queries in the query pair is less than a threshold. A word edit distance between two queries may be calculated by counting the minimum number of operations (e.g. insertion, deletion, substitution) required to transform one query into the other query. The word edit distance can be calculated by normalizing the minimum number with the length of the longer query. For example, a word edit distance between query "abed" and query "abc" is 0.25. Then, if the threshold is 0.25, the query pair filter 920 should retain this query pair <abcd, abc>. The query pair filter 920 may trigger the word edit distance computer 936 to calculate the word edit distance for each native query pair. After the word edit distance computer 936 finishes the calculation and sends back the result to the query pair filter 920, the query pair filter 920 can remove all native query pairs with a word edit distance less than the threshold. A small word edit distance of a query pair may indicate that one query is just a typo of the other query in the query pair, such that this query pair may not be useful for generating meaningful and relevant query suggestions.

In a different example, according to a filtering criterion, the query pair filter 920 should remove a native query pair if one of the two queries in the query pair is a popular query, e.g. "facebook", "google", "yahoo", etc., within a predetermined query set. The query pair filter 920 may trigger the popular query identifier 938 to determine whether each native query pair includes at least one popular query within the predetermined query set. After the popular query identifier 938 sends back the result to the query pair filter 920, the query pair filter 920 can remove all native query pairs including at least one popular query. A very popular query within the predetermined query set, like "facebook", "google", may indicate the user's interest to a specific website, which can be independent of the preceding query or subsequent query. Therefore, this kind of popular query may not be a good query suggestion for the user.

In various embodiments, the query pair filter 920 may filter the native query pairs based on one or more of the above listed filter criteria. When multiple filtering criteria are applied, the query pair filter 920 can combine them either in a logical conjunction manner or in a logical disjunction manner.

After filtering the native query pairs, the query pair filter 920 can generate filtered query pairs and send the filtered query pairs to the query pair splitter 940. The query pair splitter 940 in this example can split the filtered query pairs into two groups: a specialization group and a lateral group. One of the two queries in each query pair in the specialization group is a substring of the other query in the query pair in the specialization group. In the lateral group of query pairs, neither of the two queries in each query pair in the lateral group is a substring of the other query in the query pair in the lateral group. In one embodiment, the system prefers query pairs in the lateral group over query pairs in the specialization group for selecting query suggestions. The query pair splitter 940 may send the query pairs to the collocation score calculator 950.

The collocation score calculator 950 in this example may calculate a collocation score for each query pair, whether it is in a specialization group or in a lateral group. A collocation score for a query pair may represent a degree of correlation between the two queries in the query pair. In one example, a collocation score may be a pointwise mutual information (PMI) score. For a query pair <X, Y>, its PMI score may be calculated by:

$$\text{PMI score} = \#<X,Y>/(\#X * \#Y),$$

wherein #<X, Y> represents the number of times the query pair <X, Y> appeared in the query logs during the retrieval period; #X represents the number of times the query X appeared in the query logs during the retrieval period; and #Y represents the number of times the query Y appeared in the query logs during the retrieval period. The collocation score calculator 950 may calculate a collocation score, e.g. a PMI score, for each query pair to be associated with the query pair. The collocation score calculator 950 can then send the query pairs and collocation scores to the scored query pair generator/updater 960.

The scored query pair generator/updater 960 in this example may store the query pairs with associated metadata into the query pair database 745. The associated metadata for each query pair may include a collocation score and indication about whether the query pair belongs to a specialization group or a lateral group. In one embodiment, the scored query pair generator/updater 960 may update existing query pairs in the query pair database 745 with the newly generated query pairs or newly generated associated metadata. For example, after a certain time period, a query pair not in the query pair database 745 becomes more popular and thus retained by the query pair filter 920 to be qualified as a new query pair generated and stored into the query pair database 745 by the scored query pair generator/updater 960. For example, after a certain time period, a query pair in the query pair database 745 has new data in the query logs and thus has a new collocation score calculated by the collocation score calculator 950. As such, the scored query pair generator/updater 960 can update the collocation score for this query pair in the query pair database 745.

In one embodiment, following similar manners described above, the query pair generator 770 may also generate queries pairs from a specific user's own query logs, such that the query pairs may be more personalized for generating query suggestions for the specific user.

Figure 10:
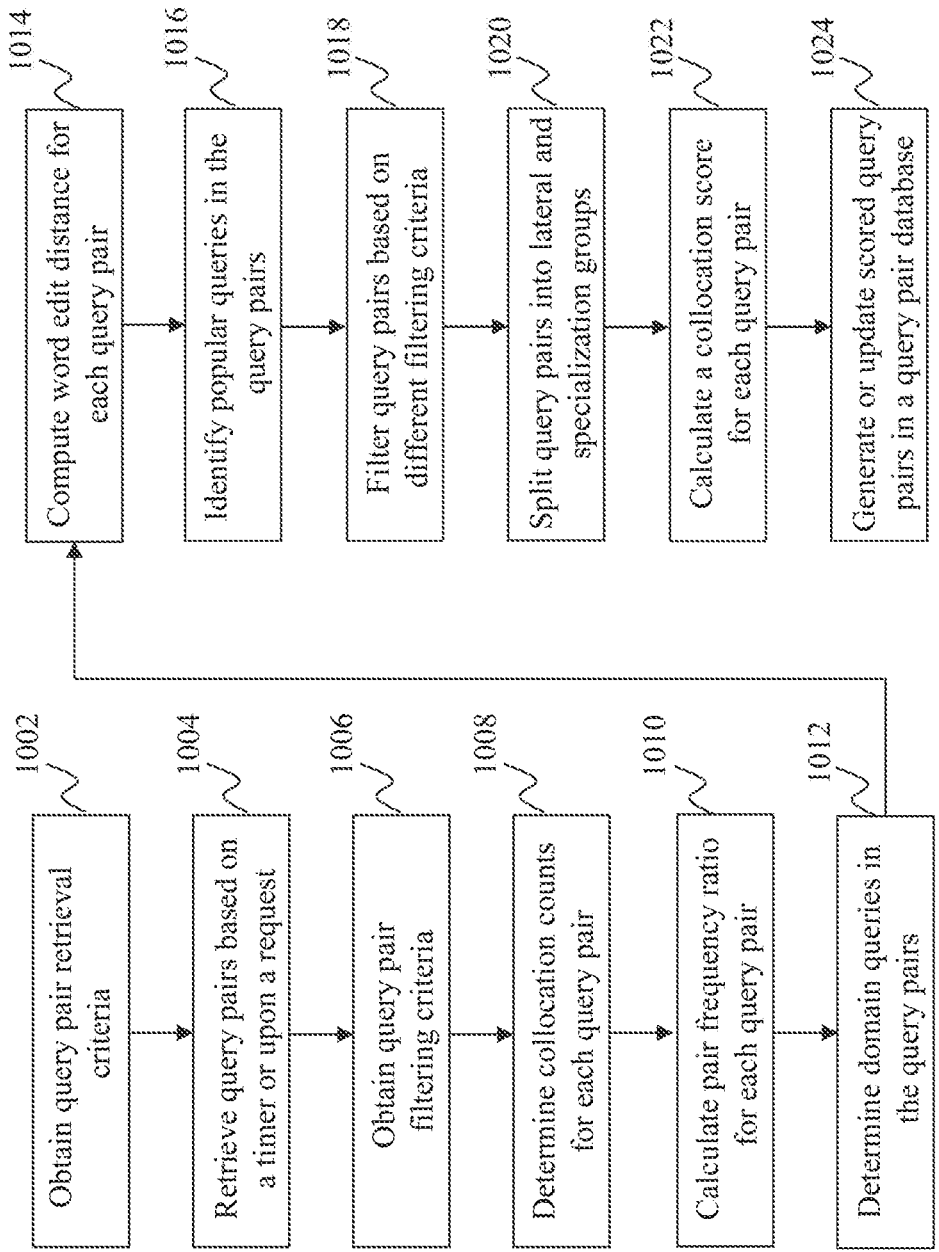
FIG. 10 is a flowchart of an exemplary process performed by a query pair generator, according to an embodiment of the present teaching.

FIG. 10 is a flowchart of an exemplary process performed by a query pair generator, e.g. the query pair generator 770 in FIG. 9, according to an embodiment of the present teaching. At 1002, query pair retrieval criteria are obtained. Query pairs are retrieved at 1004 based on a timer or upon a request, in accordance with the query pair retrieval criteria. One or more query pair filtering criteria are obtained at 1006. Collocation counts are determined at 1008 for each query pair. Pair frequency ratio is calculated at 1010 for each query pair. At 1012, domain queries are determined in the query pairs.

At 1014, word edit distance is computed for each query pair. Popular queries in a predetermined query set are identified at 1016 from the query pairs. At 1018, query pairs are filtered based on one or more filtering criteria. The filtered query pairs are split at 1020 into two groups: a lateral group and a specialization group. A collocation score is calculated at 1022 for each query pair. Scored query pairs are generated or updated in a query pair database at 1024.

It can be understood that the order of the steps shown in FIG. 10 may be changed according to different embodiments of the present teaching.

Figure 11:
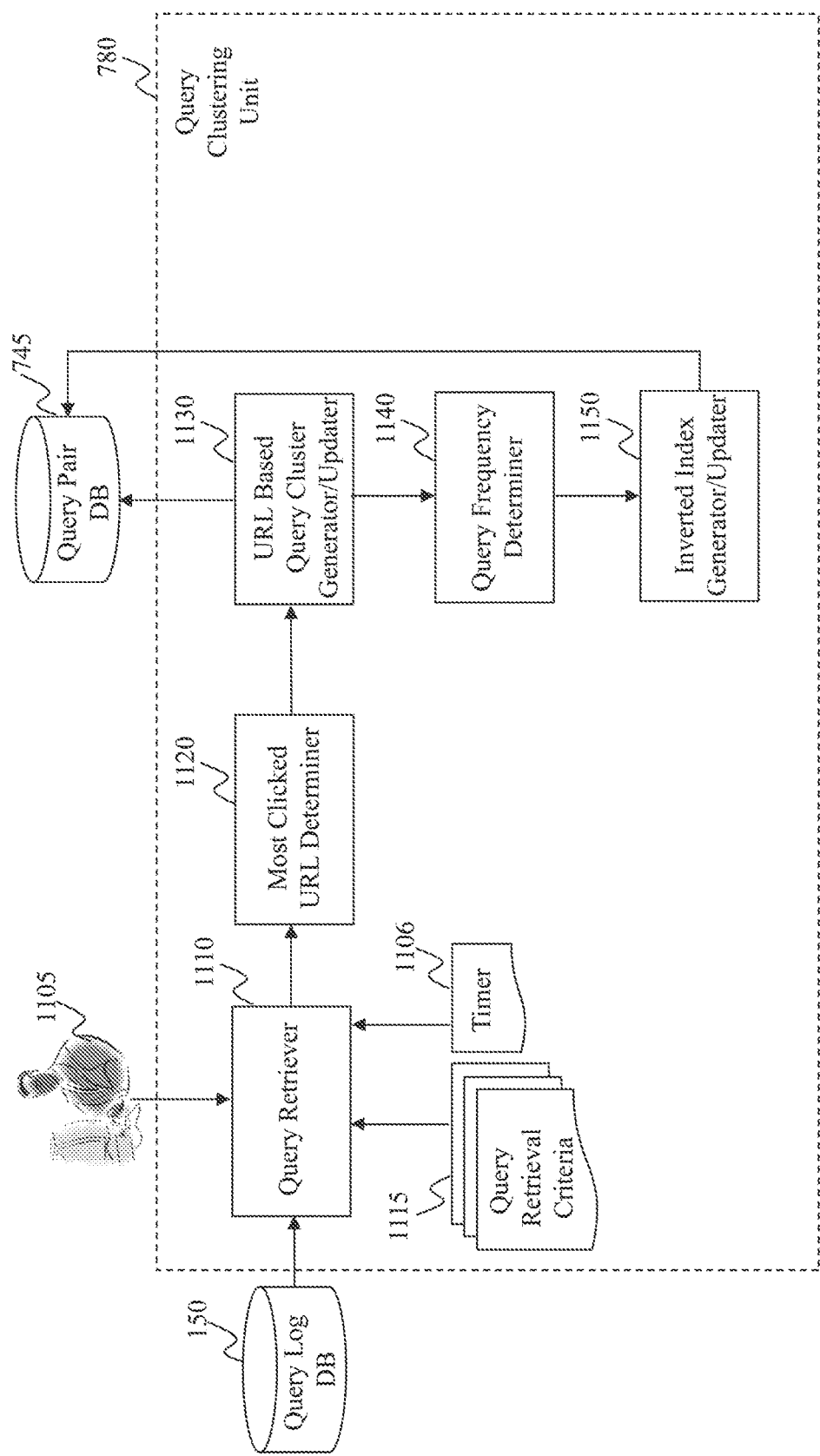
FIG. 11 illustrates an exemplary diagram of a query clustering unit, according to an embodiment of the present teaching.

FIG. 11 illustrates an exemplary diagram of a query clustering unit 780, according to an embodiment of the present teaching. As shown in FIG. 11, the query clustering unit 780 in this example includes a query retriever 1110, a most clicked URL determiner 1120, one or more query retrieval criteria 1115, a timer 1106, a URL based query cluster generator/updater 1130, a query frequency determiner 1140, and an inverted index generator/updater 1150.

In one embodiment, the query retriever 1110 may receive a request from a manager 1105 to generate or update query cluster related information in the query pair database 745. In another embodiment, the query retriever 1110 may be triggered by the timer 1106 to generate or update query cluster related information in the query pair database 745, i.e. the query retriever 1110 may update query cluster related information periodically, e.g. every day, every week, or every month. The manager 1105 may be the same as or different from the manager 905. The timer 1106 may be same as or different from the timer 906.

Either based on the timer 1106 or upon the request from the manager 1105, the query retriever 1110 can retrieve some queries from the query log database 150, based on some query retrieval criteria 1115. For example, according to a query retrieval criterion, the query retriever 1110 retrieves queries from query logs generated within a retrieval period like last year or last three years. The query retriever 1110 may then send the retrieved queries to the most clicked URL determiner 1120.

The most clicked URL determiner 1120 in this example can determine a most clicked URL for each query. A most clicked URL for a query may be defined as the URL clicked for the most times or by most users, among the URLs provided in response to the query. The most clicked URL determiner 1120 can associate each query with its most clicked URL, and send the queries associated with their respective most clicked URLs to the URL based query cluster generator/updater 1130.

The URL based query cluster generator/updater 1130 in this example can cluster the queries based on their respective most clicked URLs. For example, the URL based query cluster generator/updater 1130 may assign queries associated with a same most clicked URL into a same cluster. In other examples, the URL based query cluster generator/updater 1130 may assign queries associated with similar most clicked URLs into a same cluster. The URL based query cluster generator/updater 1130 can store information about query clusters into the query pair database 745, such that each query in each query pair in the query pair database 745 is associated with a query cluster. In one embodiment, the URL based query cluster generator/updater 1130 may update the information about query clusters in the query pair database 745, such that the query pair database 745 may include a new cluster or a query in the query pair database 745 may be associated with a new cluster. In one embodiment, the URL based query cluster generator/updater 1130 may also store the information about query clusters into the query log database 150. The URL based query cluster generator/updater 1130 can send the clustered queries to the query frequency determiner 1140 for determining query frequency.

The query frequency determiner 1140 in this example can determine a query frequency for each query in each query cluster. A query frequency associated with a query may be the number of times the query appeared in the query logs during the retrieval period, to represent a degree of popularity of the query. The query frequency determiner 1140 may associate each query in each cluster with a query frequency, e.g. the queries shown in FIG. 5. The query frequency determiner 1140 may send the queries with frequency information to the inverted index generator/updater 1150.

The inverted index generator/updater 1150 in this example can determine a canonical query within each query cluster to be served as an inverted index for the query cluster. For example, based on the frequencies of queries in a cluster, the inverted index generator/updater 1150 can identify a query with the highest frequency among the queries in the cluster, and assign the query as the canonical query. The inverted index generator/updater 1150 can store the inverted index information into the query pair database 745, such that each query cluster in the query pair database 745 has a canonical query. As discussed above, a canonical query may be utilized as a bridge query for generating query suggestions, since each query in the query pair database 745 has an associated canonical query. In one embodiment, the inverted index generator/updater 1150 may update the inverted index information in the query pair database 745, such that a query cluster in the query pair database 745 may have a new canonical query due to frequency change. In one embodiment, the inverted index generator/updater 1150 may also store the inverted index information into the query log database 150.

Figure 12:
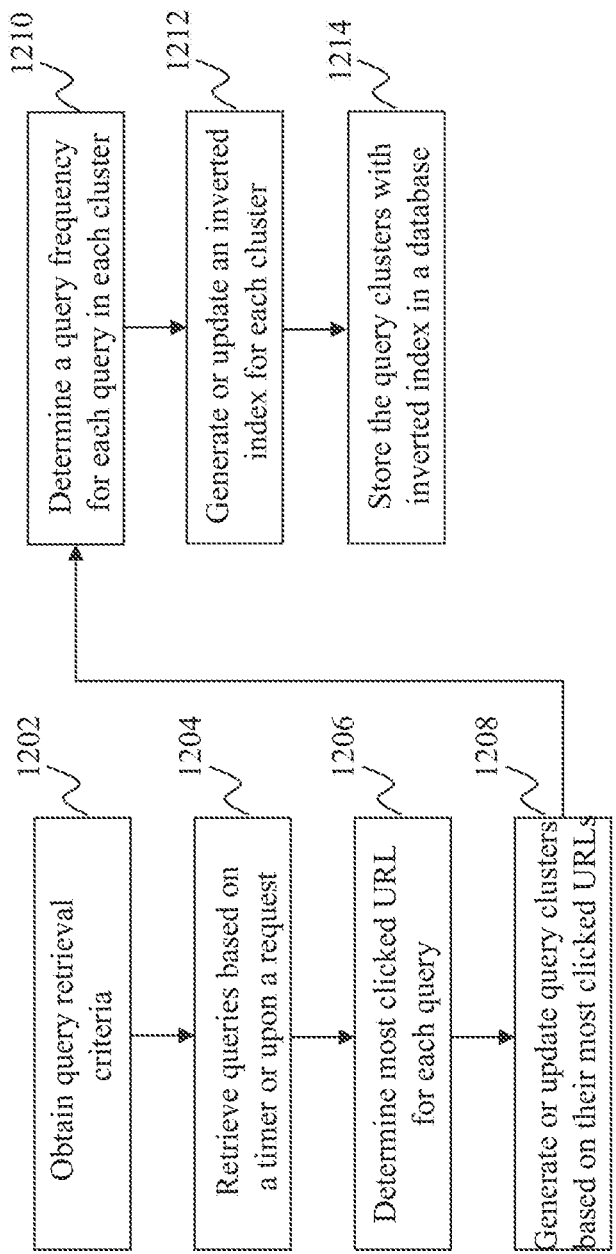
FIG. 12 is a flowchart of an exemplary process performed by a query clustering unit, according to an embodiment of the present teaching.

FIG. 12 is a flowchart of an exemplary process performed by a query clustering unit, e.g. the query clustering unit 780 in FIG. 11, according to an embodiment of the present teaching. Query retrieval criteria are obtained at 1202. Queries are retrieved at 1204 based on a timer or upon a request. A most clicked URL is determined at 1206 for each query. At 1208, query clusters are generated or updated based on their most clicked URLs.

At 1210, a query frequency is determined for each query in each query cluster. An inverted index is generated or updated at 1212 for each query cluster. At 1214, the query clusters are stored with the inverted index in a database.

It can be understood that the order of the steps shown in FIG. 12 may be changed according to different embodiments of the present teaching.

Figure 13:
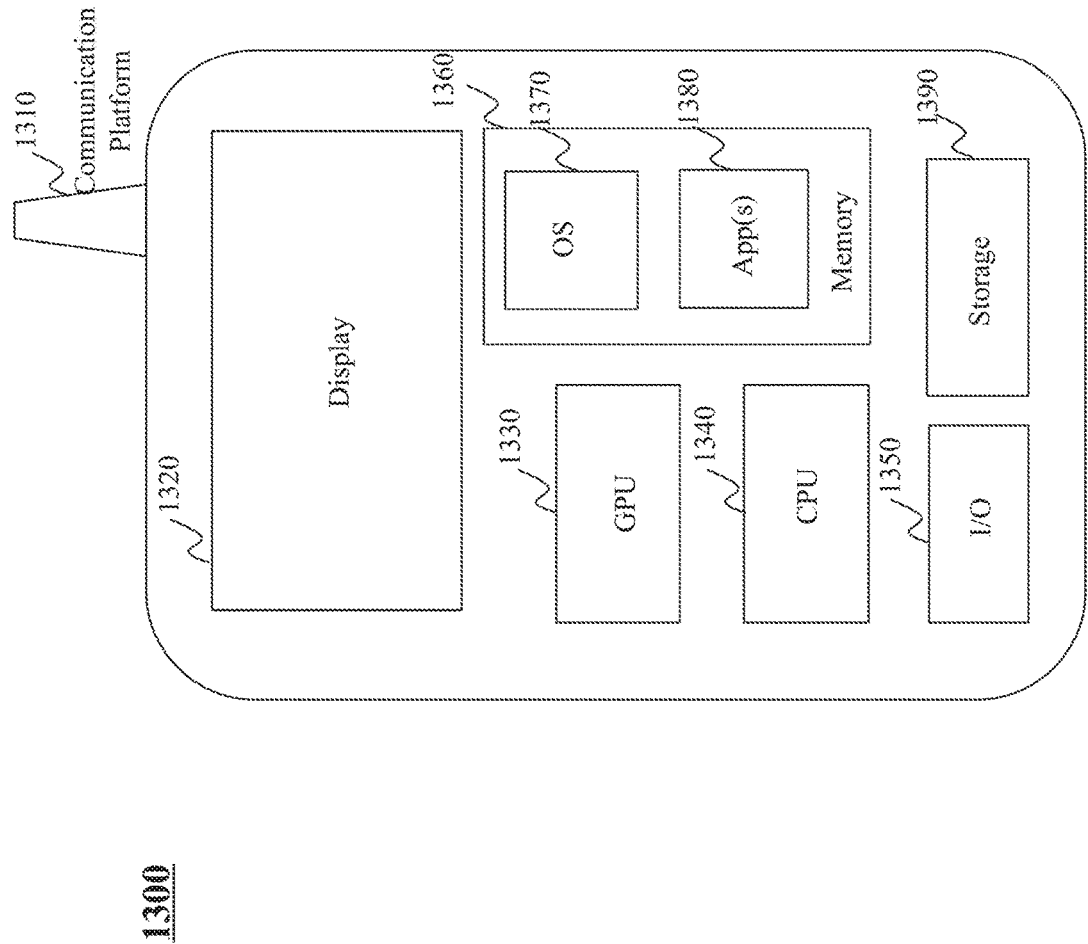
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which a search result or query suggestion is presented and interacted—with is a mobile device 1300, including, but not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving search result or query suggestions on the mobile device 1300. User interactions with the search result and query suggestions information may be achieved via the I/O devices 1350 and provided to the search suggestion engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the search suggestion engine 140, the search serving engine 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about providing context based query suggestions as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
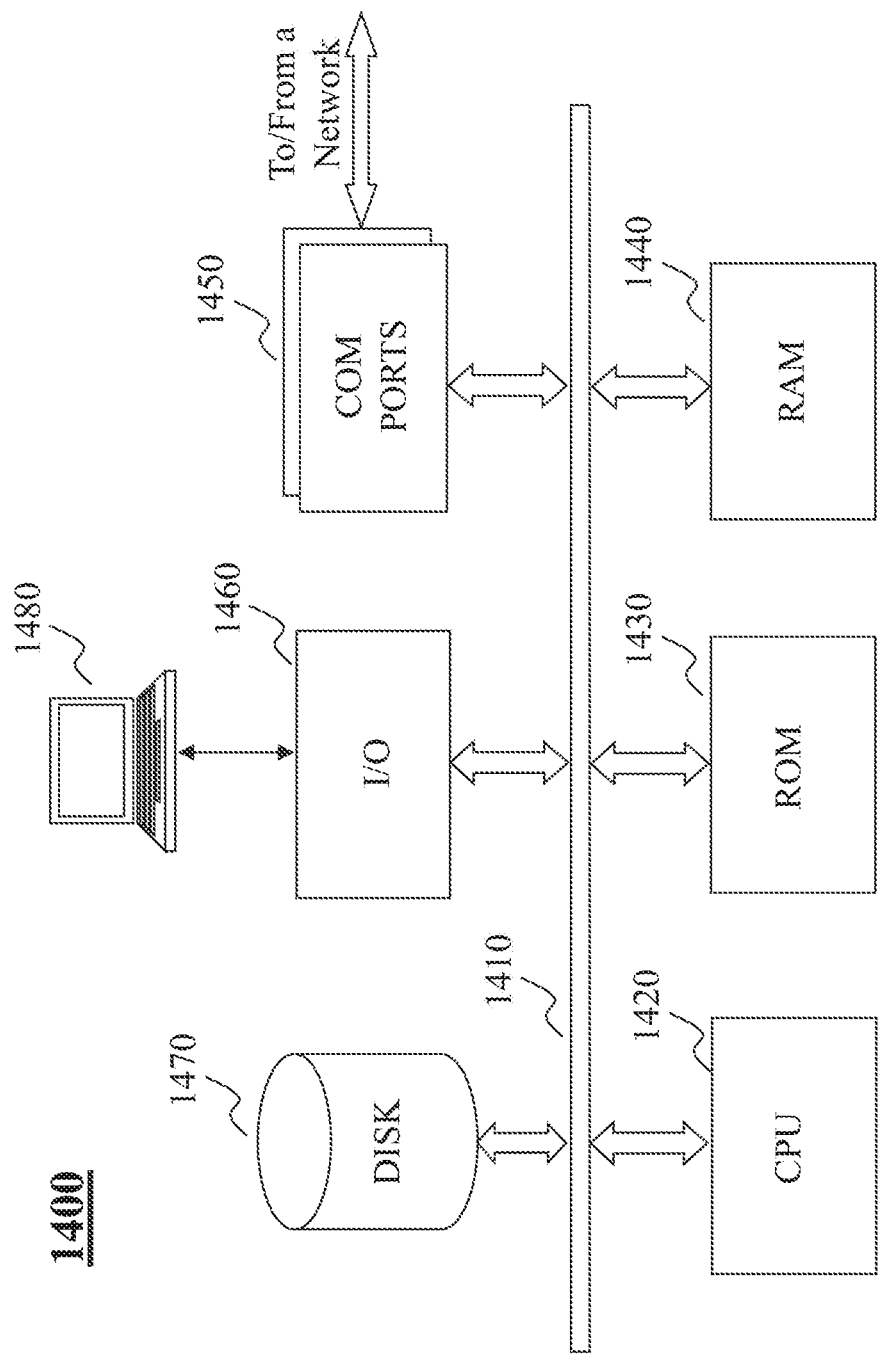
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of providing context based query suggestions, as described herein. For example, the search serving engine 130, the search suggestion engine 140, etc., may be implemented on a computer such as computer 1400, via its hardware, software program, firmware, or a combination thereof. Although only one such computer is shown, for convenience, the computer functions relating to providing context based query suggestions as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of providing context based query suggestions, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with providing context based query suggestions. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, providing context based query suggestions as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for providing a query suggestion, the method comprising:
    retrieving query pairs from query logs;
    filtering the query pairs by removing at least one of the query pairs, wherein the at least one of the query pairs meets the following criterion:
        a ratio between a frequency of appearance, in the query logs, of a more popular query in the at least one of the query pairs and a frequency of appearance, in the query logs, of a less popular query in the at least one of the query pairs being greater than a threshold;
    updating, based on the filtered query pairs, query pairs stored in a database;
    receiving, via a search application operating on a computing device associated with a user, a request for query suggestions with respect to a query prefix input by the user;
    analyzing the request to determine a preceding query input by the user and the query prefix; and
    presenting, based on the preceding query, the query prefix, and the updated database, via the search application, a plurality of query suggestions as a response to the request.

2. The method of claim 1, wherein the query logs are retrieved within a predetermined time period.

3. The method of claim 1, further comprising filtering one or more additional query pairs that appear in the query logs for less than a number of times.

4. A non-transitory, computer-readable medium having information recorded thereon for providing a query suggestion, wherein the information, when read by a machine, causes the machine to perform operations comprising:
    retrieving query pairs from query logs;
    filtering the query pairs by removing at least one of the query pairs, wherein the at least one of the query pairs meets the following criterion:
        a ratio between a frequency of appearance, in the query logs, of a more popular query in the at least one of the query pairs and a frequency of appearance, in the query logs, of a less popular query in the at least one of the query pairs being greater than a threshold;

updating, based on the filtered query pairs, query pairs stored in a database;

receiving, via a search application operating on a computing device associated with a user, a request for query suggestions with respect to a query prefix input by the user;

analyzing the request to determine a preceding query input by the user and the query prefix; and presenting, based on the preceding query, the query prefix, and the updated database, via the search application, a plurality of query suggestions as a response to the request.

5. The medium of claim 4, wherein the query logs are retrieved within a predetermined time period.

6. The medium of claim 4, further comprising filtering one or more additional query pairs that appear in the query logs for less than a number of times.

7. A system for providing a query suggestion, the system comprising:

memory storing computer program instructions; and one or more processors that, in response to executing the computer program instructions, effectuate operations comprising:

retrieving query pairs from query logs;

filtering the query pairs by removing at least one of the query pairs, wherein the at least one of the query pairs meets the following criterion:

a ratio between a frequency of appearance, in the query logs, of a more popular query in the at least one of the query pairs and a frequency of appearance, in the query logs, of a less popular query in the at least one of the query pairs being greater than a threshold;

updating, based on the filtered query pairs, query pairs stored in a database;

receiving, via a search application operating on a computing device associated with a user, a request for query suggestions with respect to a query prefix input by the user;

analyzing the request to determine a preceding query input by the user and the query prefix; and presenting, based on the preceding query, the query prefix, and the updated database, via the search application, a plurality of query suggestions as a response to the request.

8. The system of claim 7, wherein the query logs are retrieved within a predetermined time period.

9. The system of claim 7, further comprising filtering one or more additional query pairs that appear in the query logs for less than a number of times.

* * * * *